US012675839B2

(12) United States Patent
Checa Oloriz et al.

(10) Patent No.: US 12,675,839 B2
(45) Date of Patent: Jul. 7, 2026

(54) DIGITAL ASSISTANT INDICATOR APPEARANCE

(71) Applicant: Apple Inc., Cupertino, CA (US)

(72) Inventors: Jose Antonio Checa Oloriz, San Francisco, CA (US); Miquel Estany Rodriguez, San Francisco, CA (US); Arjun Kaul, Cupertino, CA (US); Pedro Mari, Santa Cruz, CA (US); Christopher C. Niederauer, Los Altos Hills, CA (US); James J. Owen, San Francisco, CA (US); William A. Sorrentino, III, Mill Valley, CA (US)

(73) Assignee: Apple Inc., Cupertino, CA (US)

(*) Notice: Subject to any disclaimer, the term of this patent is extended or adjusted under 35 U.S.C. 154(b) by 90 days.

(21) Appl. No.: 18/612,495

(22) Filed: Mar. 21, 2024

(65) Prior Publication Data

US 2024/0403997 A1 Dec. 5, 2024

Related U.S. Application Data

(60) Provisional application No. 63/539,942, filed on Sep. 22, 2023, provisional application No. 63/471,250, filed on Jun. 5, 2023.

(51) Int. Cl.
*G06T 3/18* (2024.01)
*G06T 19/00* (2011.01)

(52) U.S. Cl.
CPC .............. *G06T 3/18* (2024.01); *G06T 19/006* (2013.01)

(58) Field of Classification Search
CPC ......... G06T 3/18; G06T 19/006; G06T 13/00; G06T 13/40
See application file for complete search history.

(56) References Cited

U.S. PATENT DOCUMENTS

| | | | |
|---|---|---|---|
| 8,688,446 B2 | 4/2014 | Yanagihara | |
| 9,626,955 B2 | 4/2017 | Fleizach et al. | |
| 9,633,004 B2 | 4/2017 | Giuli et al. | |

(Continued)

FOREIGN PATENT DOCUMENTS

| | | | | | |
|---|---|---|---|---|---|
| KR | 20250049408 A | * | 4/2025 | ........... | G06F 3/0481 |

OTHER PUBLICATIONS

Ashbrook, Daniel L., "Enabling Mobile Microinteractions", Retrieved from the Internet: URL: http://danielashbrook.com/wp-content/uploads/2012/06/2009-Ashbrook-Thesis.pdf, May 2010, 186 pages.

(Continued)

*Primary Examiner* — Chante E Harrison
(74) *Attorney, Agent, or Firm* — YHE Law LLP

(57) ABSTRACT

An example process includes: while displaying a portion of an extended reality (XR) environment representing a current field of view of a user: detecting, with the one or more sensors, a user input to invoke a digital assistant; in response to detecting a user input to invoke the digital assistant, displaying a user interface element associated with the digital assistant; distorting the display of a first portion of the current field of view behind the user interface element; detecting a change in the position of the user interface element relative to the current field of view; and distorting the display of a second portion of the current field of view behind the user interface element.

27 Claims, 8 Drawing Sheets

(56)                References Cited

U.S. PATENT DOCUMENTS

| | | | |
|---|---|---|---|
| 9,633,660 | B2 | 4/2017 | Haughay |
| 9,633,674 | B2 | 4/2017 | Sinha |
| 9,668,121 | B2 | 5/2017 | Naik et al. |
| 9,697,822 | B1 | 7/2017 | Naik et al. |
| 9,715,875 | B2 | 7/2017 | Piernot et al. |
| 9,721,566 | B2 | 8/2017 | Newendorp et al. |
| 9,818,400 | B2 | 11/2017 | Paulik et al. |
| 9,858,925 | B2 | 1/2018 | Gruber et al. |
| 9,886,953 | B2 | 2/2018 | Lemay et al. |
| 9,922,642 | B2 | 3/2018 | Pitschel et al. |
| 9,966,065 | B2 | 5/2018 | Gruber et al. |
| 9,966,068 | B2 | 5/2018 | Cash et al. |
| 9,972,304 | B2 | 5/2018 | Paulik et al. |
| 9,986,419 | B2 | 5/2018 | Naik et al. |
| 10,049,663 | B2 | 8/2018 | Orr et al. |
| 10,049,668 | B2 | 8/2018 | Huang et al. |
| 10,074,360 | B2 | 9/2018 | Kim |
| 10,083,688 | B2 | 9/2018 | Piernot et al. |
| 10,083,690 | B2 | 9/2018 | Giuli et al. |
| 10,089,072 | B2 | 10/2018 | Piersol et al. |
| 10,102,359 | B2 | 10/2018 | Cheyer |
| 10,169,329 | B2 | 1/2019 | Futrell et al. |
| 10,170,123 | B2 | 1/2019 | Orr et al. |
| 10,176,167 | B2 | 1/2019 | Evermann |
| 10,180,572 | B2 | 1/2019 | Osterhout et al. |
| 10,185,542 | B2 | 1/2019 | Carson et al. |
| 10,186,254 | B2 | 1/2019 | Williams et al. |
| 10,192,552 | B2 | 1/2019 | Raitio et al. |
| 10,199,051 | B2 | 2/2019 | Binder et al. |
| 10,223,066 | B2 | 3/2019 | Martel et al. |
| 10,241,644 | B2 | 3/2019 | Gruber et al. |
| 10,249,300 | B2 | 4/2019 | Booker et al. |
| 10,269,345 | B2 | 4/2019 | Sanchez et al. |
| 10,297,253 | B2 | 5/2019 | Walker et al. |
| 10,311,871 | B2 | 6/2019 | Newendorp et al. |
| 10,475,446 | B2 | 11/2019 | Gruber et al. |
| 10,497,365 | B2 | 12/2019 | Gruber et al. |
| 10,568,032 | B2 | 2/2020 | Freeman et al. |
| 10,659,851 | B2 | 5/2020 | Lister et al. |
| 10,671,428 | B2 | 6/2020 | Zeitlin |
| 10,706,841 | B2 | 7/2020 | Gruber et al. |
| 10,747,498 | B2 | 8/2020 | Stasior et al. |
| 10,791,176 | B2 | 9/2020 | Phipps et al. |
| 10,978,090 | B2 | 4/2021 | Binder et al. |
| 11,087,759 | B2 | 8/2021 | Lemay et al. |
| 11,133,008 | B2 | 9/2021 | Piernot et al. |
| 11,152,002 | B2 | 10/2021 | Walker et al. |
| 12,175,614 | B2 * | 12/2024 | Rudman ................ G06V 10/25 |
| 2021/0074068 | A1 * | 3/2021 | Spivack ................ G06N 20/00 |
| 2024/0104861 | A1 * | 3/2024 | DeDonato .............. G06F 3/012 |
| 2024/0185849 | A1 * | 6/2024 | Carbune ............. G06T 19/006 |
| 2025/0022237 | A1 * | 1/2025 | Burton ................ G06T 19/006 |

OTHER PUBLICATIONS

Bell, Jason, "Machine Learning Hands-On for Developers and Technical Professionals", Wiley, Nov. 3, 2014, 82 pages.

Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, online available at: https://dl.acm.org/doi/pdf/10.1145/2971648.2971730, Sep. 12-16, 2016, pp. 73-84.

* cited by examiner

System
100

System
100

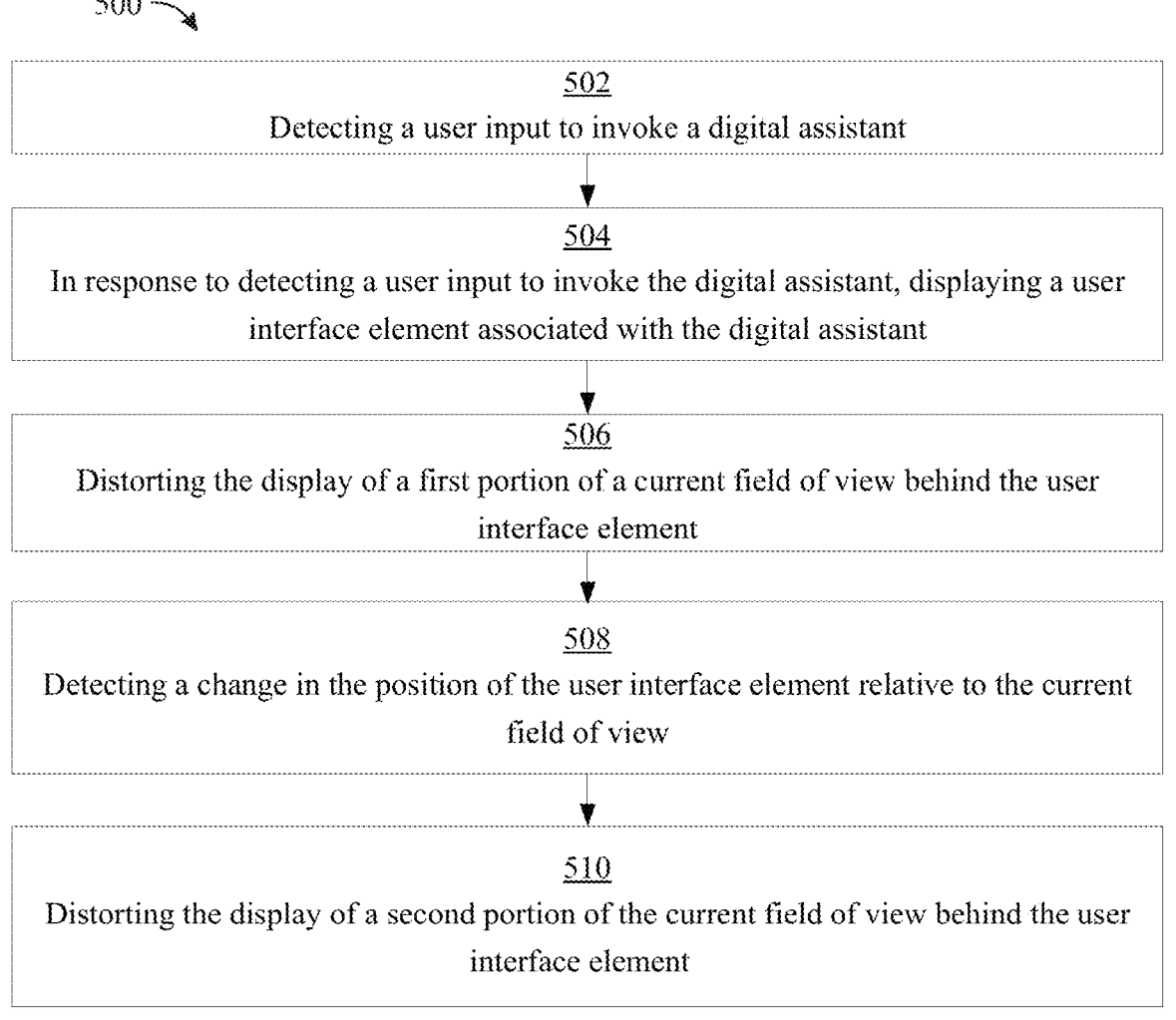

500

502
Detecting a user input to invoke a digital assistant

504
In response to detecting a user input to invoke the digital assistant, displaying a user interface element associated with the digital assistant 506
Distorting the display of a first portion of a current field of view behind the user interface element 508
Detecting a change in the position of the user interface element relative to the current field of view 510
Distorting the display of a second portion of the current field of view behind the user interface element

FIG. 5

DIGITAL ASSISTANT INDICATOR APPEARANCE

CROSS-REFERENCE TO RELATED APPLICATIONS

This application claims priority to U.S. Patent Application No. 63/471,250, entitled "DIGITAL ASSISTANT INDICATOR APPEARANCE," filed on Jun. 5, 2023, and claims priority to U.S. Patent Application No. 63/539,942, entitled "DIGITAL ASSISTANT INDICATOR APPEARANCE," filed on Sep. 22, 2023, the content of which are hereby incorporated by reference in their entirety.

FIELD

This relates generally to digital assistants, and in particular, to digital assistant indicator appearances and behaviors.

BACKGROUND

Digital assistants can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

Example methods are disclosed herein. An example method includes: at an electronic device with one or more processors, memory, a display, and one or more sensors: while displaying a portion of an extended reality (XR) environment representing a current field of view of a user of the electronic device: detecting, with the one or more sensors, a user input to invoke a digital assistant; in response to detecting a user input to invoke the digital assistant, displaying a user interface element associated with the digital assistant; distorting the display of a first portion of the current field of view behind the user interface element; detecting a change in the position of the user interface element relative to the current field of view; and distorting the display of a second portion of the current field of view behind the user interface element.

Example non-transitory computer-readable media are disclosed herein. An example non-transitory computer-readable storage medium stores one or more programs. The one or more programs comprise instructions, which when executed by one or more processors of an electronic device with a display and one or more sensors, cause the electronic device to: while displaying a portion of an extended reality (XR) environment representing a current field of view of a user of the electronic device: detecting, with the one or more sensors, a user input to invoke a digital assistant; in response to detecting a user input to invoke the digital assistant, displaying a user interface element associated with the digital assistant; distorting the display of a first portion of the current field of view behind the user interface element; detecting a change in the position of the user interface element relative to the current field of view; and distorting the display of a second portion of the current field of view behind the user interface element.

Example electronic devices are disclosed herein. An example electronic device comprises a display; one or more sensors; one or more processors; a memory; and one or more programs, where the one or more programs are stored in the memory and configured to be executed by the one or more processors, the one or more programs including instructions for: while displaying a portion of an extended reality (XR) environment representing a current field of view of a user of the electronic device: detecting, with the one or more sensors, a user input to invoke a digital assistant; in response to detecting a user input to invoke the digital assistant, displaying a user interface element associated with the digital assistant; distorting the display of a first portion of the current field of view behind the user interface element; detecting a change in the position of the user interface element relative to the current field of view; and distorting the display of a second portion of the current field of view behind the user interface element.

An example electronic device comprises means for: while displaying a portion of an extended reality (XR) environment representing a current field of view of a user of the electronic device: detecting, with the one or more sensors, a user input to invoke a digital assistant; in response to detecting a user input to invoke the digital assistant, displaying a user interface element associated with the digital assistant; distorting the display of a first portion of the current field of view behind the user interface element; detecting a change in the position of the user interface element relative to the current field of view; and distorting the display of a second portion of the current field of view behind the user interface element.

BRIEF DESCRIPTION OF FIGURES

FIG. 5 illustrates a process for interacting with an extended reality (XR) environment, according to various examples.

DESCRIPTION

Figure 1A:
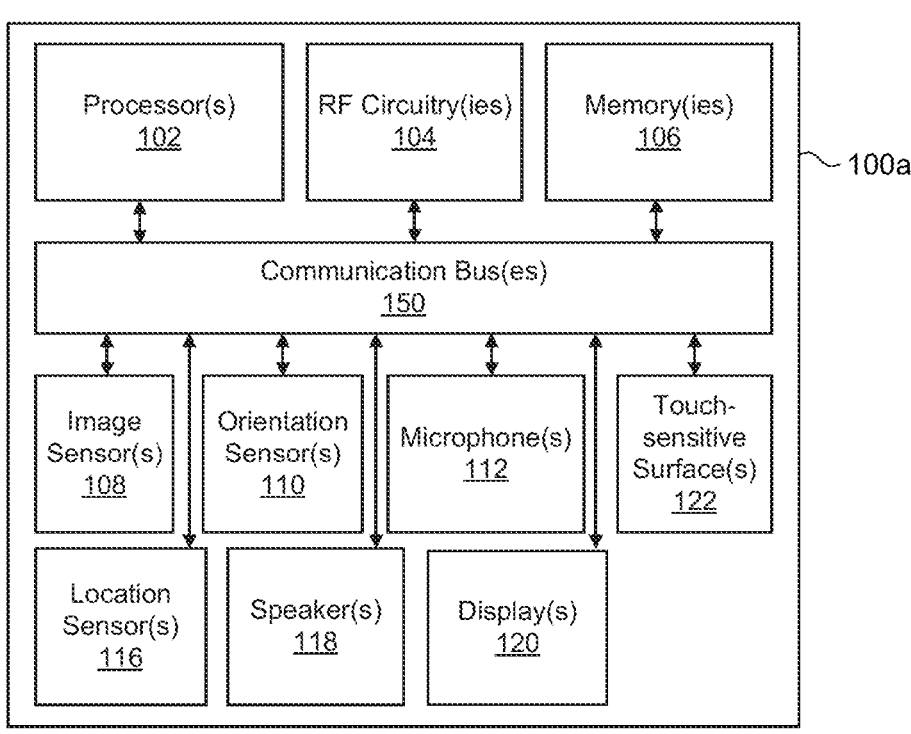
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
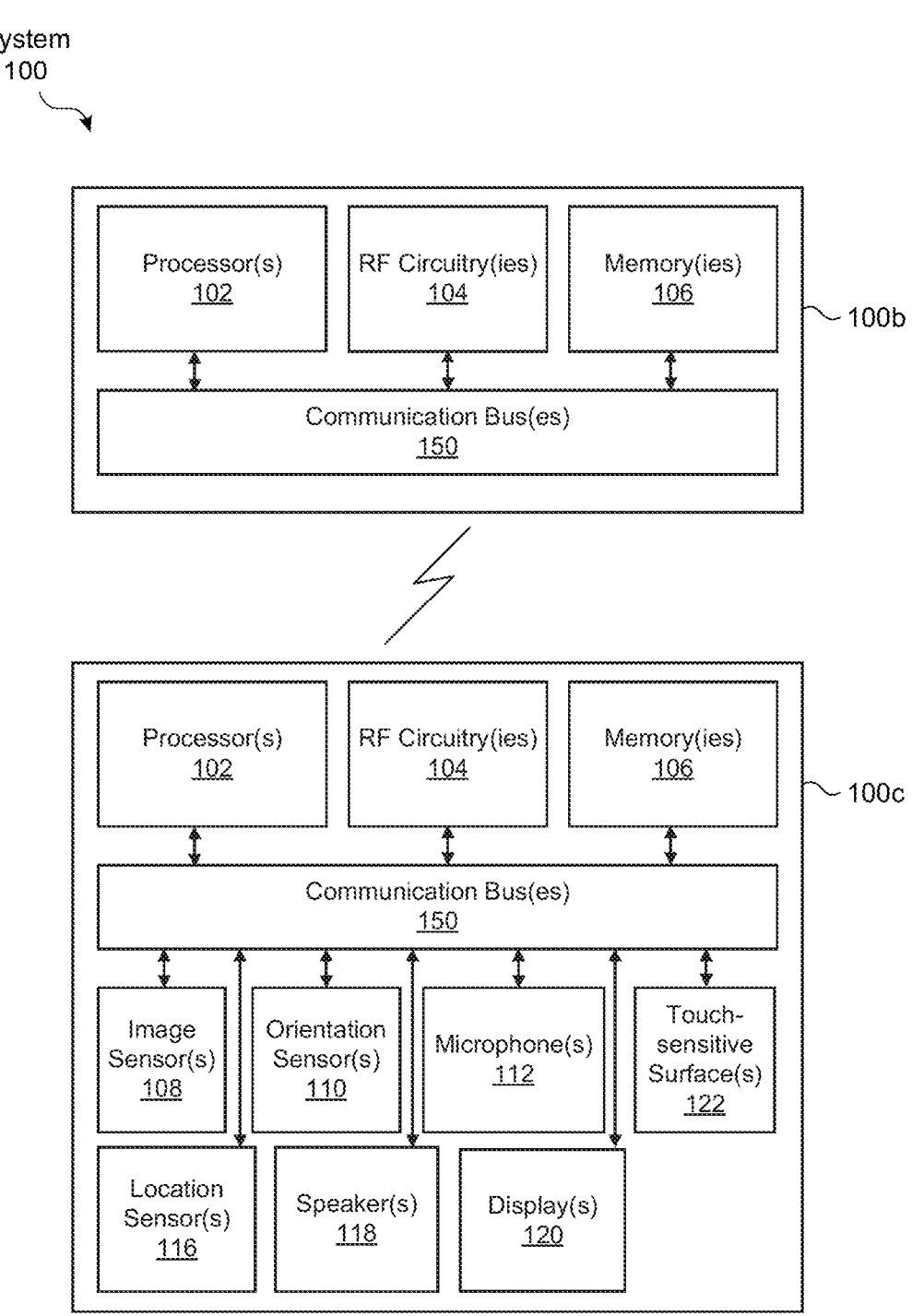

FIG. 1A and FIG. 1B depict exemplary system 100 for use in various computer-generated reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

As used herein, an "installed application" refers to a software application that has been downloaded onto an electronic device (e.g., devices 100a, 100b, and/or 100c) and is ready to be launched (e.g., become opened) on the device. In some examples, a downloaded application becomes an installed application by way of an installation program that extracts program portions from a downloaded package and integrates the extracted portions with the operating system of the computer system.

As used herein, the terms "open application" or "executing application" refer to a software application with retained state information, e.g., in memory(ies) 106. An open or executing application is, optionally, any one of the following types of applications:

an active application, which is currently displayed on a display screen of the device that the application is being used on (or which is currently being projected by the device that the application is being used on);

a background application (or background processes), which is not currently displayed (or not currently projected), but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

As used herein, a virtual object is viewpoint-locked when a device displays the virtual object at the same location and/or position in the viewpoint of the user, even as the viewpoint of the user shifts (e.g., changes). In examples where the device is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In examples where the device has a display that can be repositioned with respect to the user's head, the viewpoint of the user is the view that is being presented to the user on the display. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In examples in which the device is a head-mounted device, the viewpoint of the user is locked to the orientation of the user's head, such that the virtual object is also referred to as a "head-locked virtual object."

Figure 2A:
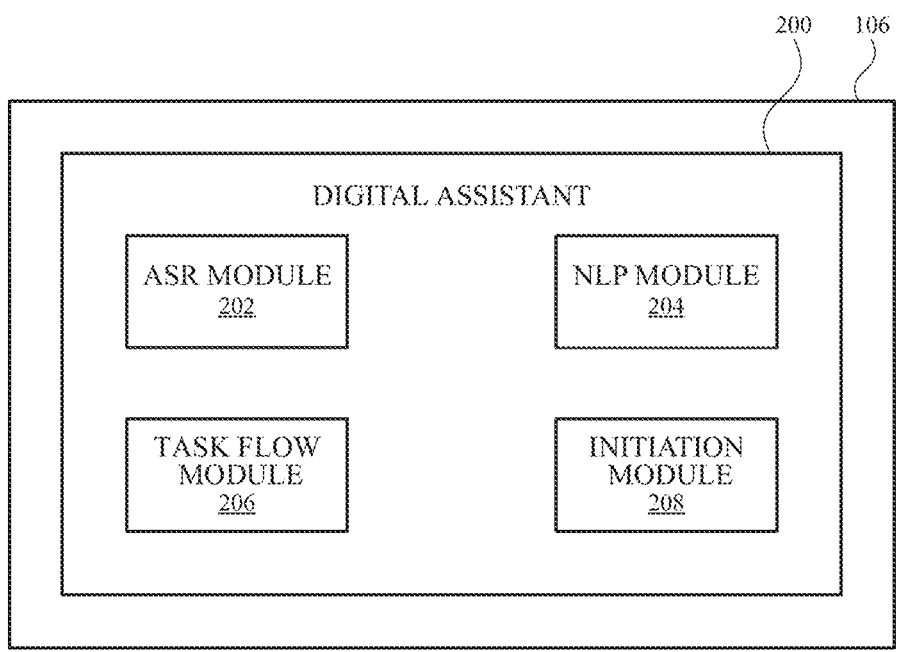
FIG. 2A illustrates an architecture of a digital assistant, according to various examples.

As used herein, a virtual object is environment-locked (alternatively, "world-locked") when a device displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some examples, device uses a stationary frame of reference (e.g., a coordinate system that is anchored to a fixed location and/or object in the physical environment) to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment FIG. 2A illustrates an architecture of digital assistant (DA) 200, according to various examples. In some examples, DA 200 is at least partially implemented (e.g., as computer-executable instructions) stored in memory(ies) 106.

FIG. 2A shows only one example architecture of DA 200, and DA 200 can have more or fewer components than shown, can combine two or more components, or can have a different configuration or arrangement of the components. Further, although the below describes that a single component of DA 200 performs a certain function, another component of DA 200 may perform the function, or the function may be performed by a combination of two or more components.

DA 200 includes automatic speech recognition (ASR) module 202, natural language processing (NLP) module 204, task flow module 206, and initiation module 208.

DA 200 processes natural language input (e.g., in spoken or textual form) to initiate (e.g., perform) a corresponding task for a user. For example, ASR module 202 is configured to perform automatic speech recognition (ASR) on received natural language speech input to obtain candidate textual representation(s). NLP module 204 is configured to perform natural language processing (NLP) on the candidate textual representation(s) to determine corresponding actionable intent(s). An "actionable intent" (or "user intent") represents a task that can be performed by DA 200, and can have an associated task flow implemented in task flow module 206. The associated task flow is a series of programmed actions and steps that DA 200 takes to perform the task.

Figure 2B:
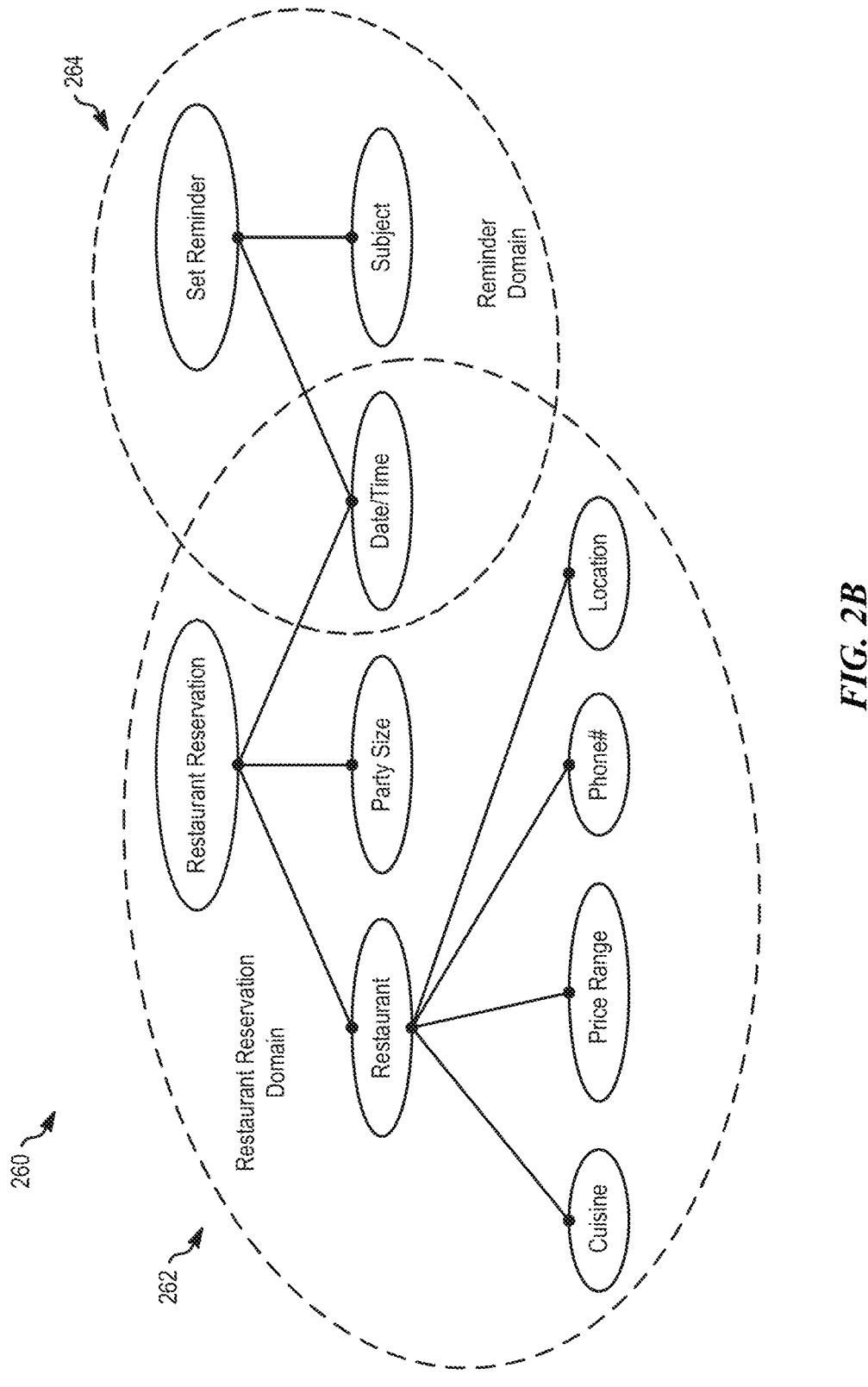
FIG. 2B an ontology for processing natural language input, according to various examples.

FIG. 2B illustrates ontology 260 that NLP module 204 uses to process natural language input, according to various examples. Ontology 260 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 260 defines how a parameter represented by the property node pertains to the task represented by the actionable intent node.

In some examples, ontology 260 is made up of actionable intent nodes and property nodes. Within ontology 260, each actionable intent node is linked to one or more property nodes either directly or through one or more intermediate property nodes. Similarly, each property node is linked to one or more actionable intent nodes either directly or through one or more intermediate property nodes. For example, as shown in FIG. 2B, ontology 260 includes a "restaurant reservation" node (i.e., an actionable intent node). Property nodes "restaurant," "date/time" (for the reservation), and "party size" are each directly linked to the actionable intent node (i.e., the "restaurant reservation" node).

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 2B, ontology 260 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 260.

An actionable intent node, along with its linked property nodes, is described as a "domain." In the present discussion, each domain is associated with a respective actionable intent, and refers to the group of nodes (and the relationships there between) associated with the particular actionable intent. For example, ontology 260 shown in FIG. 2B includes an example of restaurant reservation domain 262 and an example of reminder domain 264 within ontology 260. The restaurant reservation domain includes the actionable intent node "restaurant reservation," property nodes "restaurant," "date/time," and "party size," and sub-property nodes "cuisine," "price range," "phone number," and "location." Reminder domain 264 includes the actionable intent node "set reminder," and property nodes "subject" and "date/time." In some examples, ontology 260 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 262 and reminder domain 264.

While FIG. 2B illustrates two example domains within ontology 260, other domains include, for example, "find a movie," "initiate a phone call," "find directions," "schedule a meeting," "send a message," and "provide an answer to a question," "read a list," "providing navigation instructions," "provide instructions for a task," "provide weather information," and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 260 includes all the domains (and hence actionable intents) that the digital assistant is capable of understanding and acting upon. In some examples, ontology 260 is modified, such as by adding or removing entire domains or nodes, or by modifying relationships between the nodes within the ontology 260.

In some examples, nodes associated with multiple related actionable intents are clustered under a "super domain" in ontology 260. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 260 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in a vocabulary index (e.g., implemented within NLP module 204) in association with the property or actionable intent represented by the node. For example, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index optionally includes words and phrases in different languages.

NLP module 204 receives the candidate textual representation(s) from ASR module 202, and for each candidate representation, determines what nodes are implicated by the words in the candidate text representation. In some examples, if a word or phrase in the candidate text representation is found to be associated with one or more nodes in ontology 260 (via the vocabulary index), the word or phrase "triggers" or "activates" those nodes. Based on the quantity and/or relative importance of the activated nodes, NLP module 204 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

In some examples, NLP module 204 is implemented using one or more machine learning mechanisms (e.g., neural networks). In particular, the one or more machine learning mechanisms are configured to receive a candidate text representation, and optionally, associated context information (discussed below). Based on the candidate text representation, and optionally, the associated context information, the one or more machine learning mechanisms are configured to determine intent confidence scores over a set of candidate actionable intents. NLP module 204 can select one or more candidate actionable intents from the set of candidate actionable intents based on the determined intent confidence scores. In some examples, an ontology (e.g., ontology 260) is also used to select the one or more candidate actionable intents from the set of candidate actionable intents.

In some examples, once NLP module 204 determines an actionable intent, task flow module 206 causes execution of the corresponding task flow to provide an output to satisfy the user intent. It will be appreciated that the number of actionable intents (and corresponding task flows) recognized by DA 200 can define the scope of the DA's capabilities. Example DAs include Siri by Apple Inc., Alexa by Amazon.com, Inc., Google Assistant by Google LLC, Cortana by Microsoft Corp, and Bixby by Samsung Electronics Co., Ltd.

DA 200 includes initiation module 208. Initiation module 208 is configured to determine whether a natural language input is intended for DA 200, e.g., based on other received input(s). In some examples, a session of DA 200 initiates and/or DA 200 processes the natural language input, responsive to initiation module 208 determining that the natural language input is intended for DA 200. Examples of inputs indicating that natural language input is intended for DA 200 include a spoken trigger input (e.g., "Hey Assistant"), input pressing a button, input selecting a displayed icon, predetermined types of gesture input, gaze input (e.g., indicating gaze at an icon), and the like. Further details about determining whether a natural language input is intended for DA 200 are discussed with respect to FIGS. 3A-3D.

FIGS. 3A-3D illustrate a user's current view of environment 300 (e.g., an XR environment) using device 302. Device 302 is implemented as device 100a or 100c. In some examples, device 302 is a head mounted device, e.g., a headset, eyeglasses, lenses designed for placement on the user's eyes, and the like. In other examples, device 302 is another type of electronic device such as a smart phone, a tablet device, a laptop computer, or a projection-based device.

In some examples, device 302 displays the current view of environment 300 shown in FIGS. 3A-3D. For example, environment 300 is a virtual environment or device 302 displays the current view using pass-through video of a physical environment.

In other examples, at least a portion of the current view shown in FIGS. 3A-3D is directly viewed by the user. For example, the user views environment 300 (e.g., a physical environment) directly via a transparent or translucent display of device 302. In such examples, device 302 can superimpose (e.g., display) virtual elements over the user's current view of environment 300. As another example, device 302 is a projection-based device and the user views environment 300 directly without using a display and views virtual objects projected by device 302 into environment 300. Accordingly, while the below discusses device 302 displaying various virtual objects, it will be appreciated that device 302 can project the virtual objects onto environment 300 in an analogous manner.

Figure 3A:
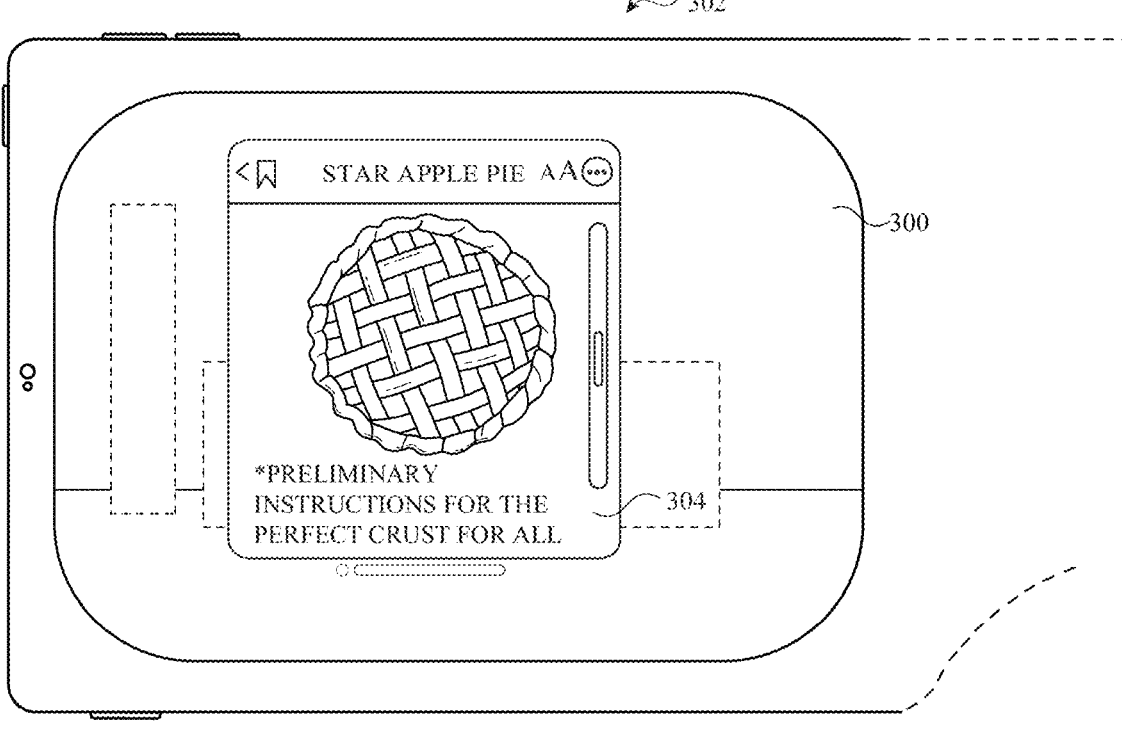
FIGS. 3A-3D illustrate a view of an extend reality environment using an electronic device, according to various examples.

In FIG. 3A, the current view includes first object 304, a virtual object. In some examples, first object 304 is persistent in the current field of view of environment 300, e.g., persistent until device 302 receives user input to cease display of first object 304. For example, first object 304 is a viewpoint-locked virtual object.

Figure 3B:
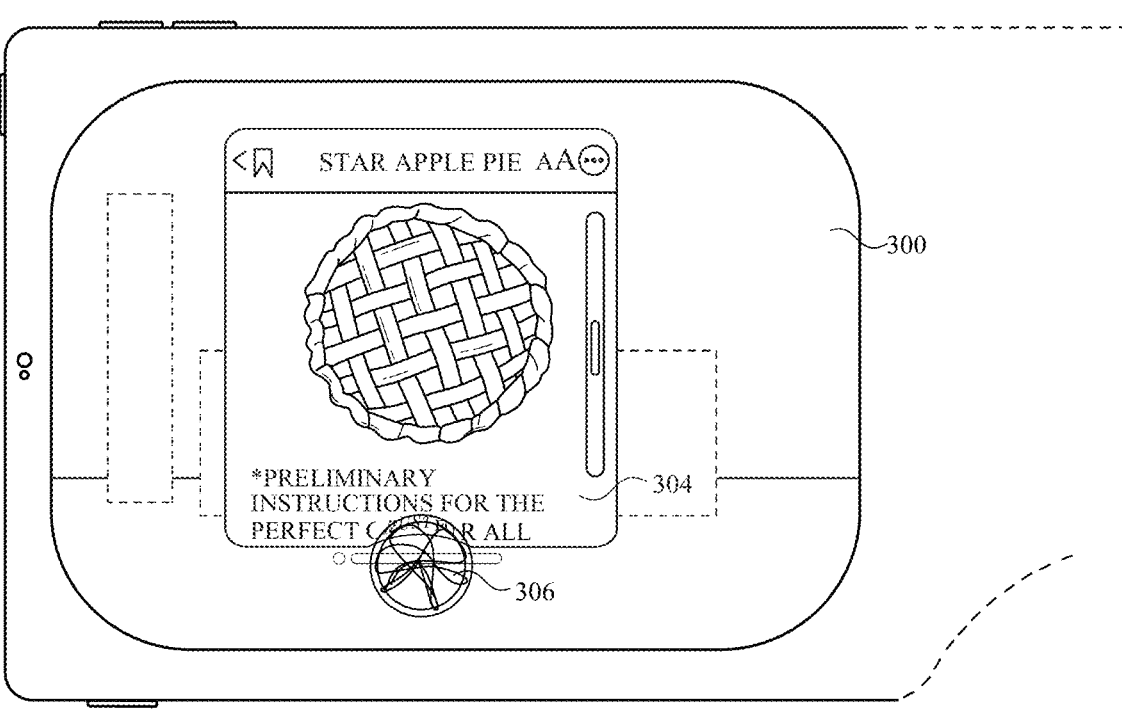

In FIG. 3B, in response to a user invoking a digital assistant (e.g., via button press, audible input (e.g., "Hey Digital Assistant"), gestures, or the like), a user element 306 associated with digital assistant is displayed. User element 306 is at least partially transparent such that objects (either real world objects or virtual objects) behind user element 306 are at least partially visible through user element 306, however, the appearance distorted as discussed in greater detail below. In some examples, user element 306 may include an animated or static user element that is associated with the digital assistant and that may be used to indicate that the digital assistant is initiated, e.g., listening and/or processing input.

As illustrated in FIG. 3B, a portion of the current view of environment 300 is visible through user element 306, but visually distorted. For example, the distortion may include altering the display of the objects in the field of view behind user element 306 to mimic optical distortion effects such as refraction effects, pincushion distortion, barrel distortion, mustache distortion, fisheye lens effects, and/or other optical distortion effects. In some examples, user element 306 may further be animated, e.g., rotating, swirling, changing size and/or color over time, or in response to user input. In such instances, the distortion of the portion of current view of environment 300 visible through user element 306 may also change over time based on the animation of user element 306. For example, the distortion effects may rotate, swirl, change in magnification and/or color, as user element 306 changes.

Figure 3C:
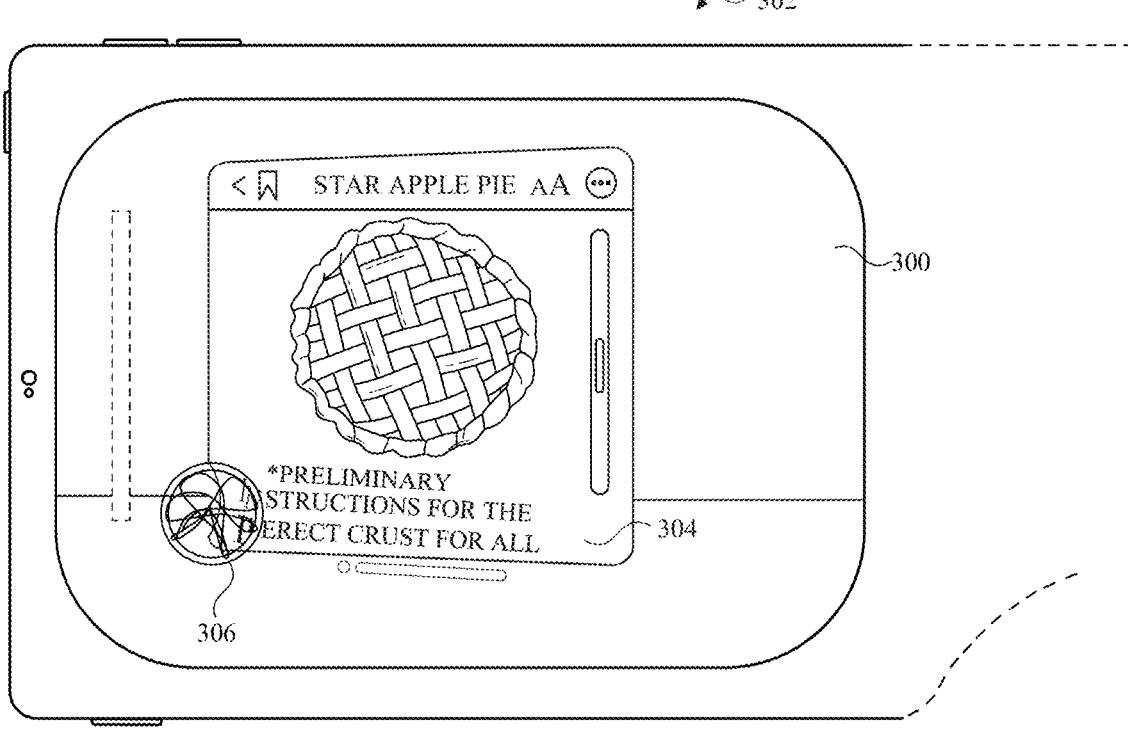

Further, the distortion effect changes in real-time as the portion of the current view of environment 300 behind user element 306 changes, e.g., in response to movement of the user device 302 or user element 306 relative to the current field of view of environment 300. In one example, as illustrated in FIG. 3C, user element 306 may be fixed relative to first object 304, however, user element 306 may be displayed to appear at a shallower depth from the user than first object 304. Accordingly, as a user moves and changes the field of view, e.g., moving laterally to the right and toward user element 306 and first object 304 in FIG. 3C, the view through user element 306 changes relative to first object 304, thereby distorting different portions of first object 304 there behind.

Figure 3D:
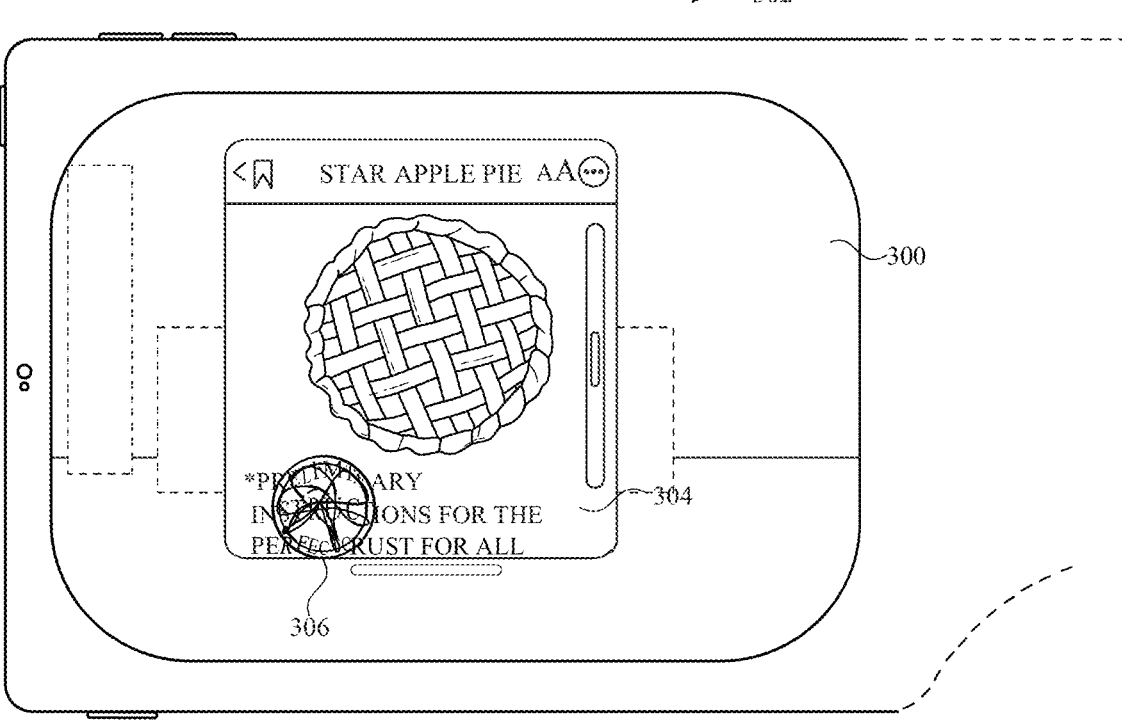

In another example, as illustrated in FIG. 3D, as a user moves the device 302, or otherwise causes user element 306 to move relative to first object 304, the portion of the current view of environment 300 that is distorted and visible through user element 306 changes. For example, if user element 306 were over first object 304 at a first time, the portion of first object 304 visible through user element 306 would be distorted but the remaining portions of first object 304 would be displayed undistorted. As the relative position of user element 306 changes relative to first object 304 (e.g., in response to a user moving device 302, changing their gaze, etc., thereby changing the relative positions of first object 304 and user interface element 306), a different portion of the first object 304 and/or portion of the current view of environment 300 would be distorted.

Additionally, as the user device 302 moves relative to the environment 300, reflections on user element 306 may vary accordingly. In particular, user element 304 may display reflections of the environment, including first object 304 and the content thereon, as well as other virtual and real world objects in environment 300. As user device 302 moves within the environment, the reflections displayed on user element 304 will vary accordingly. Further, as user device 302 moves around user element 304, reflections thereon will vary accordingly.

Figure 4:
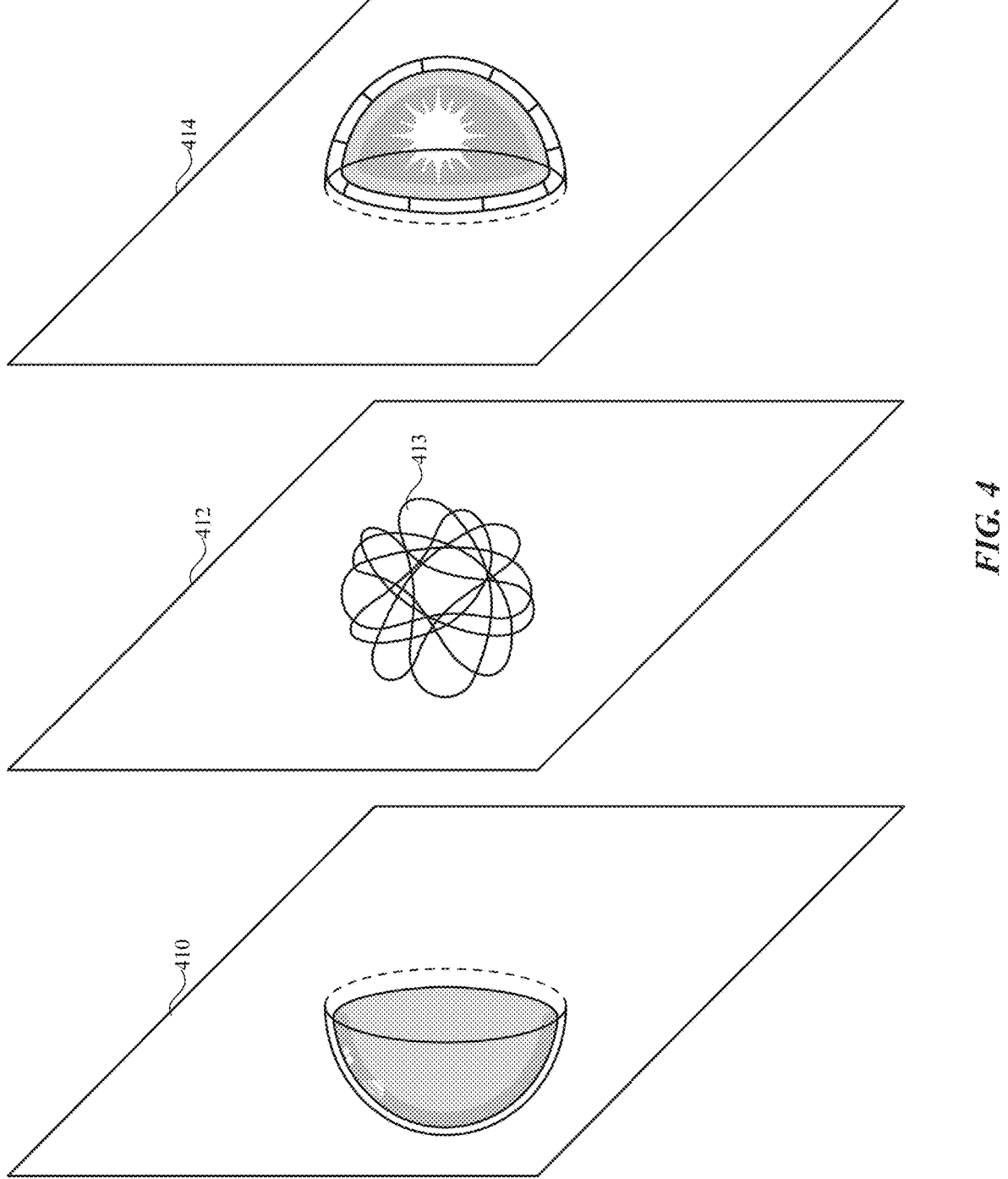
FIG. 4 illustrates various layers of a user element of an extended reality (XR) environment, according to various examples.

FIG. 4 illustrates various layers of user element 306 in an extend reality (XR) environment, according to various examples.

In FIG. 4 user element 306 includes a top layer 410, a middle layer 412, and a bottom layer 414. Top layer 410, middle layer 412, and bottom layer 414 includes different elements that interact with each other to create user element 306 as shown in FIGS. 3B-3D and further to create a simulated movement within user element 306 that influences the distortion and reflections discussed with respect to FIGS. 3B-3D.

Top layer 410 reflects virtual objects and real world objects in environment 300 as user device 302 moves within the environment. In some examples, top layer 410 reflects a subset of the virtual objects and real world objects in environment 300. The subset of virtual objects and real world objects highlights objects that a user may find important or interesting. In some examples, top layer 410 reflects a static image of environment 300 that includes the virtual objects and real world objects.

In some examples, the reflection of top layer 410 is generated by mapping lights of environment 300 to a sphere map to realistically reflect both the lights of environment 300 and the virtual objects and real world objects of environment 300. In particular, lights of environment are mapped onto an infinitely far-away spherical wall and stored as a texture that reflects what a mirrored sphere would look like if placed into environment 300. The texture contains reflective data of environment 300, including the lights of environment 300, the virtual objects, and the real world objects. In this way, the reflection of top layer 410 is a realistic reflection of what environment 300 and the objects contained within environment 300 look like.

Middle layer 412 includes a predetermined number (e.g., 4, 6, 7, 10, 12, etc.) of sections 413. Sections 413 of middle layer 412 move in response to audible inputs received from a user to create a blurring animation and/or an animation that has the appearance of blurring to a user. In some examples, each of sections 413 is a different color. In some examples, the blurring animation is created by the different colors of sections 413 appearing to mix and shift as sections 413 rotate.

In some examples, sections 413 rotate in response to detecting audible inputs. In some examples, the speed that sections 413 rotate is based on one or more qualities of the audible input such as a speed of the audible input, a volume of the audible input, a pitch of the audible input, a frequency of the audible input, etc. In some examples, the speed that sections 413 rotate changes when one or more of the qualities of the audible input changes. For example, a user may provide an audible input that is quiet or slow and in response sections 413 may rotate slowly. Similarly, the user may provide an audible input that is loud or fast and in response sections 413 may rotate quickly. The user may then change the input from a loud input to a quiet input, causing sections 413 to start rotating quickly and then slow down in response to the user adjusting the volume level of the audible input.

In some examples, sections 413 are not colored. In some examples, the blurring animation is created by using a procedural lighting effect to generate lights as sections 413 rotate. In some examples, middle layer 412 does not include any color and coloring effects of user element 306 are provided by other layers of user element 306, such as top layer 410 or bottom layer 414.

Bottom layer 414 includes darkening and lightening effects that create contrast within user element 306, allowing a user to more clearly view the reflections of top layer 410 and sections 413 of middle layer 412. In some examples, the darkening effect of bottom layer 414 occurs in a first portion of bottom layer 414, such as the middle of bottom layer 414. In some examples, the location of the first portion is predetermined. In some examples, the location of the first portion is based on the reflections and/or animations of user element 306. In some examples, bottom layer 414 includes a color effect that combined with the animation effects of middle layer 412 causes a blurring animation. The movement of sections 413 of middle layer 412 combine with the color effect of bottom layer 414 causing the animation to include a blurring of the colors.

In some examples, the combination of effects discussed above causes the distortion of objects that appear behind user element 306 as discussed above with respect to FIGS. 3B-3D. For example, when a blurring animation is displayed within user element 306 because of the movement of sections 413 of middle layer 412 and the color effects of middle layer 412 and/or bottom layer 414 objects and text that are displayed behind user element 306 appear distorted. Similarly, when the reflections shown in top layer 410 combine with the movement of sections 413 and/or other effects of middle layer 412 and bottom layer 414 the text and/or objects displayed behind user element 306 appear distorted and/or reflected.

In some examples, the distortion of objects that appear behind user element 306 is a radial distortion that extends from the center of user element 306 to the edge (or edges) of user element 306. For example, the distortion of objects that appear behind user element 306 can be a result of the rotation of sections 413 within user element 306, causing the objects behind user element 306 to distort and blur radially along the path of the edges of sections 413 (e.g., from the center to the edge of user element 306).

In some examples, the distortion of objects that appear behind user element 306 is a distortion in the color(s) of the objects behind user element 306. The elements of top layer 410, middle layer 412, and/or bottom layer 414 of user element 306 may cause the objects that appear behind user element 306 (or the portions of the objects that appear behind user element 306) to appear to be a different color. For example, when a portion of a text box appears behind user element 306, the top layer 410, middle layer 412, and/or bottom layer 414 may cause the portion of the text box to be darker, lighter, brighter, and/or change color in comparison to portions of the text box that do not appear to be behind user element 306.

It will be understood that these are examples of how the effects of the various layers of user element 306 can be combined to distort, reflect, or otherwise alter the appearance of virtual objects and real world objects displayed in environment 300 and that there could be other combinations of the effects of the layers of user element 306 that would cause similar alterations to the appearance of environment 300 and the objects the environment includes.

FIG. 5 illustrates process 500 for interacting with an extended reality (XR) environment, according to various examples. Process 500 is performed, for example, at a device (e.g., device 302). In process 500, some operations are, optionally, combined, the orders of some operations are, optionally, changed, and some operations are, optionally, omitted. In some examples, additional operations are performed in combination with process 500.

At 502, the process includes detecting, e.g., with one or more sensors of a device (e.g., device 302) a user input to invoke a digital assistant. For example, a button press or audible input including a trigger to invoke a digital assistant.

At 504, in response to detecting a user input to invoke the digital assistant, the process includes displaying a user interface element (e.g., 306) associated with the digital assistant. For example, displaying a static or animated user interface element indicating a digital assistant has been invoked and is listening and/or processing tasks.

Process 500 further includes, at 506, distorting the display of a first portion of the current view (e.g., 300) behind (i.e., at least partially visible through) the user interface element. For example, user interface element (e.g., user interface element 306) is at least partially transparent and a portion of the current view of the environment displayed through user interface element is distorted, e.g., optically distorted.

Process 500 further includes, at 508, detecting a change in the position of the user interface element relative to the current view of the environment, and distorting the display of a second portion of the current view of the environment behind the user interface element at 410.

In some examples, distorting the display of the first portion of the current field of view behind the user interface element further comprises distorting the display of the first portion of the current field of view behind the user interface element radially from the center of the user interface element. In some examples, distorting the display includes changing a color of an object behind the user interface element. In some examples, the distortion of the display is created by a plurality of sections included in a layer of the user interface element.

The operations discussed above with respect to FIG. 5 are optionally implemented by the components depicted in FIGS. 1A-1B and 2A, e.g., by system 100 and DA 200.

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

As described above, one aspect of the present technology is the gathering and use of data available from various sources to provide digital assistant interactions in an XR environment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enhance a user's experience when interacting with an XR environment. Accordingly, use of such personal information data may enable users to more accurately and efficiently accomplish tasks related to the XR environment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of using personal information for digital assistant interactions, the present technology can be configured to allow users to select to "opt in" or "opt out" of participation in the collection of personal information data during registration for services or anytime thereafter. In another example, users can select not to provide personal data for digital assistant interactions. In yet another example, users can select to limit the length of time for which personal data used for digital assistant interactions is retained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, digital assistant interactions can be provided based on non-personal information data or a bare minimum amount of personal information, such as the user's request to the digital assistant, other non-personal information available to the device, or publicly available information.

What is claimed is:

1. An electronic device, comprising:
one or more sensor(s);
one or more processors;
a memory; and
one or more programs, wherein the one or more programs are stored in the memory and configured to be executed by the one or more processors, the one or more programs including instructions for:
while displaying a portion of an extended reality (XR) environment representing a current field of view of a user of the electronic device:
detecting, with the one or more sensors, a user input to invoke a digital assistant;
in response to detecting a user input to invoke the digital assistant, displaying a user interface element associated with the digital assistant;
distorting the display of a first portion of the current field of view behind the user interface element, wherein the first portion of the current field of view behind the user interface element is displayed having an optical distortion effect;
detecting a change in a position of the user interface element relative to the current field of view; and
distorting the display of a second portion of the current field of view behind the user interface element, wherein the second portion of the current field of view behind the user interface element is displayed having an optical distortion effect.

2. The electronic device of claim 1, wherein the optical distortion effect includes a pincushion distortion effect.

3. The electronic device of claim 1, wherein the optical distortion effect includes a barrel distortion effect.

4. The electronic device of claim 1, wherein distorting the display varies as the portion of the current field of view changes.

5. The electronic device of claim 1, the one or more programs further including instructions for:
displaying a document in the current field of view, wherein the user interface element distorts content of the document viewable through the user interface element.

6. The electronic device of claim 1, wherein the user interface element is animated and the distortion of the first portion of the current field of view and the distortion of the second portion of the current field of view changes based on the animation.

7. The electronic device of claim 1, wherein distorting the display of the first portion of the current field of view behind the user interface element further comprises:
distorting the display of the first portion of the current field of view behind the user interface element radially from a center of the user interface element.

8. The electronic device of claim 1, wherein distorting the display includes changing a color of an object behind the user interface element.

9. The electronic device of claim 1, wherein the distortion of the display is created by a plurality of sections included in a layer of the user interface element.

10. A method, comprising:
at an electronic device with one or more processors, memory, and one or more sensors:
while displaying a portion of an extended reality (XR) environment representing a current field of view of a user of the electronic device:
detecting, with the one or more sensors, a user input to invoke a digital assistant;
in response to detecting a user input to invoke the digital assistant, displaying a user interface element associated with the digital assistant;
distorting the display of a first portion of the current field of view behind the user interface element, wherein the first portion of the current field of view behind the user interface element is displayed having an optical distortion effect;
detecting a change in a position of the user interface element relative to the current field of view; and
distorting the display of a second portion of the current field of view behind the user interface element, wherein the second portion of the current field of view behind the user interface element is displayed having an optical distortion effect.

11. The method of claim 10, wherein the optical distortion effect includes a pincushion distortion effect.

12. The method of claim 10 The electronic device of claim 1, wherein the optical distortion effect includes a barrel distortion effect.

13. The method of claim 10, wherein distorting the display varies as the portion of the current field of view changes.

14. The method of claim 10, further comprising:

displaying a document in the current field of view, wherein the user interface element distorts content of the document viewable through the user interface element.

15. The method of claim 10, wherein the user interface element is animated and the distortion of the first portion of the current field of view and the distortion of the second portion of the current field of view changes based on the animation.

16. The method of claim 10, wherein distorting the display of the first portion of the current field of view behind the user interface element further comprises:

distorting the display of the first portion of the current field of view behind the user interface element radially from a center of the user interface element.

17. The method of claim 10, wherein distorting the display includes changing a color of an object behind the user interface element.

18. The method of claim 10, wherein the distortion of the display is created by a plurality of sections included in a layer of the user interface element.

19. A non-transitory computer-readable storage medium storing one or more programs configured to be executed by one or more processors of an electronic device, the one or more programs including instructions for:

while displaying a portion of an extended reality (XR) environment representing a current field of view of a user of the electronic device:

detecting, with the one or more sensors, a user input to invoke a digital assistant;

in response to detecting a user input to invoke the digital assistant, displaying a user interface element associated with the digital assistant;

distorting the display of a first portion of the current field of view behind the user interface element, wherein the first portion of the current field of view behind the user interface element is displayed having an optical distortion effect;

detecting a change in a position of the user interface element relative to the current field of view; and distorting the display of a second portion of the current field of view behind the user interface element, wherein the second portion of the current field of view behind the user interface element is displayed having an optical distortion effect.

20. The non-transitory computer-readable storage medium of claim 19, wherein the optical distortion effect includes a pincushion distortion effect.

21. The non-transitory computer-readable storage medium of claim 19, wherein the optical distortion effect includes a barrel distortion effect.

22. The non-transitory computer-readable storage medium of claim 19, wherein distorting the display varies as the portion of the current field of view changes.

23. The non-transitory computer-readable storage medium of claim 19, the one or more programs further including instructions for:

displaying a document in the current field of view, wherein the user interface element distorts content of the document viewable through the user interface element.

24. The non-transitory computer-readable storage medium of claim 19, wherein the user interface element is animated and the distortion of the first portion of the current field of view and the distortion of the second portion of the current field of view changes based on the animation.

25. The non-transitory computer-readable storage medium of claim 19, wherein distorting the display of the first portion of the current field of view behind the user interface element further comprises:

distorting the display of the first portion of the current field of view behind the user interface element radially from a center of the user interface element.

26. The non-transitory computer-readable storage medium of claim 19, wherein distorting the display includes changing a color of an object behind the user interface element.

27. The non-transitory computer-readable storage medium of claim 19, wherein the distortion of the display is created by a plurality of sections included in a layer of the user interface element.

* * * * *